March 31, 1959
J. A. KLISCH
2,879,988
QUICK OPENING AND LOCKING MECHANISM
Filed Aug. 9, 1957
3 Sheets-Sheet 1
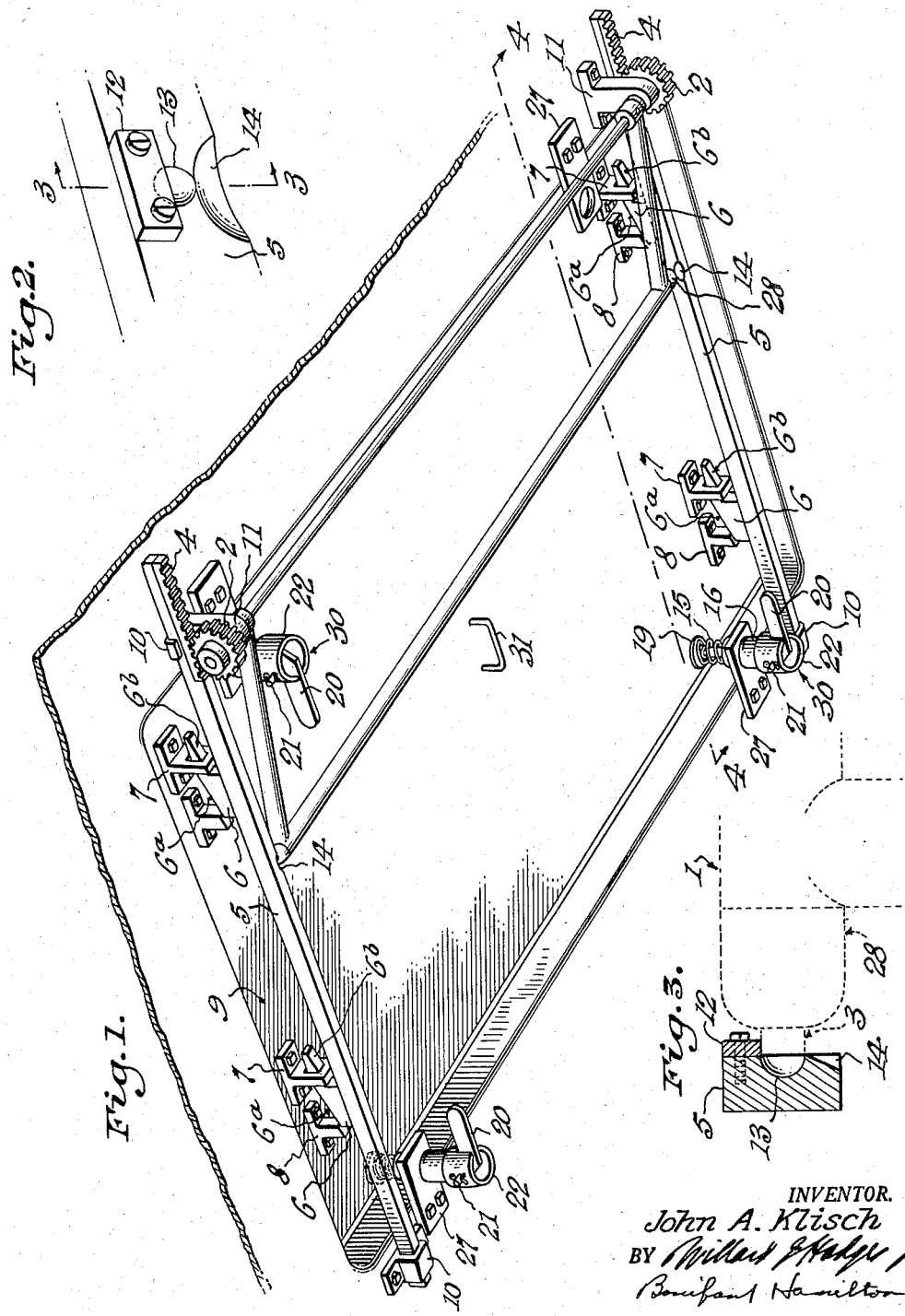
INVENTOR.
John A. Klisch
BY
ATTORNEYS March 31, 1959 J. A. KLISCH 2,879,988
QUICK OPENING AND LOCKING MECHANISM
Filed Aug. 9, 1957 3 Sheets-Sheet 2
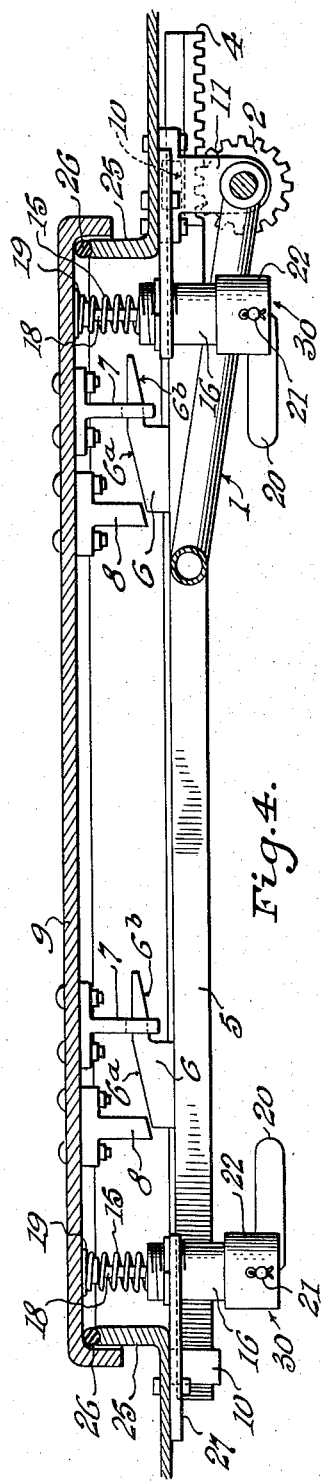
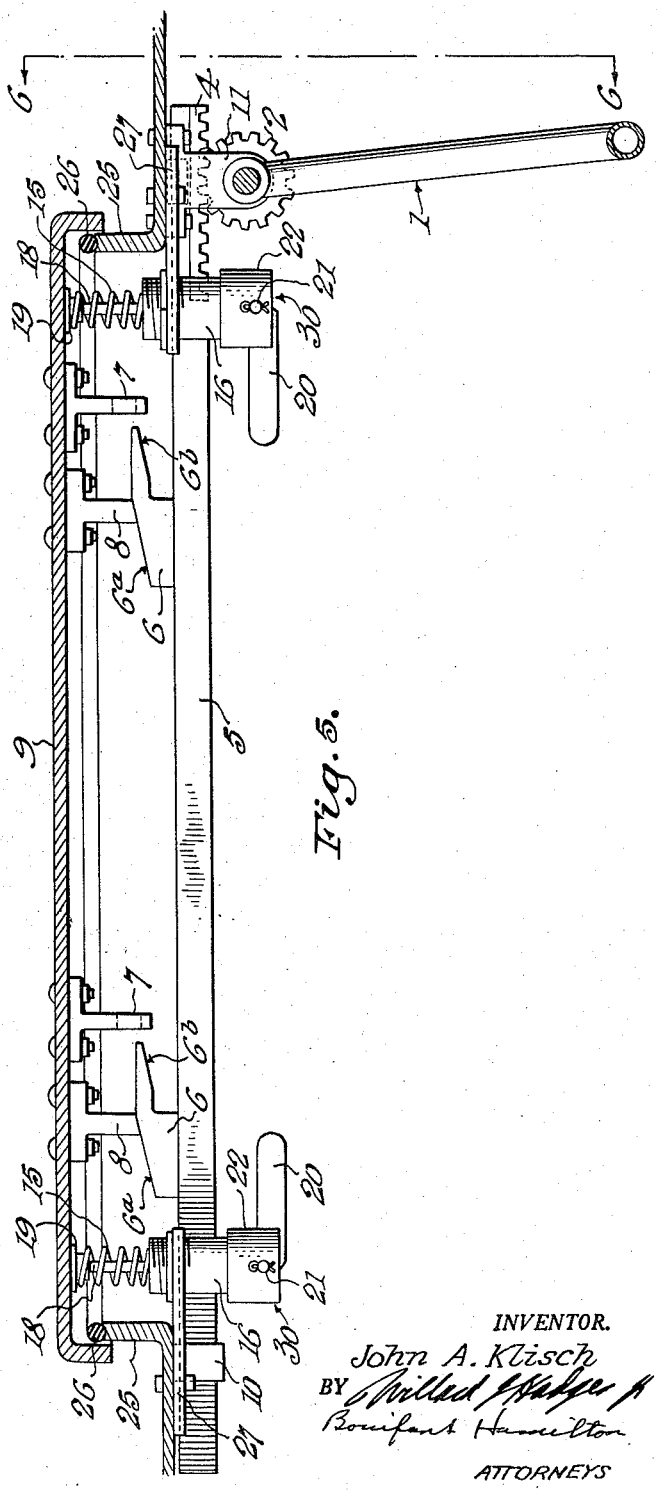
INVENTOR.
John A. Klisch
BY
ATTORNEYS

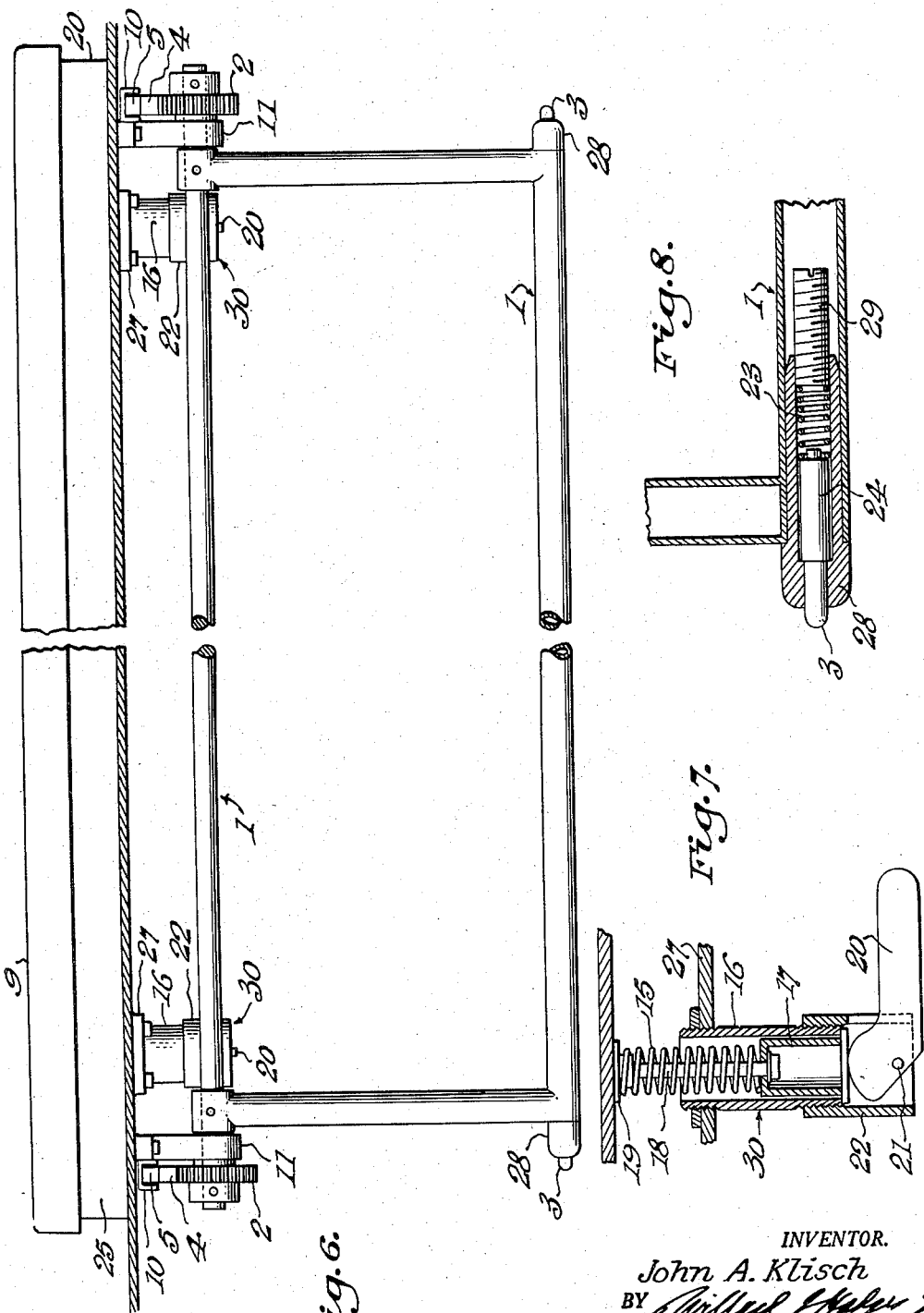

United States Patent Office 2,879,988
Patented Mar. 31, 1959

2,879,988

QUICK OPENING AND LOCKING MECHANISM

John A. Klisch, Alexandria, Va.

Application August 9, 1957, Serial No. 677,412

2 Claims. (Cl. 268—98)

(Granted under Title 35, U. S. Code (1952), sec. 266)

The invention described herein may be manufactured and used by or for the Government for governmental purposes without the payment of any royalty thereon.

The instant invention relates to a quick opening escape hatch for particular use in a land vehicle and other uses where a large mechanical advantage is necessary to force an opening.

An object of this invention is to provide a quick opening and closing escape hatch for land vehicles and the like in the event the hatch cover is frozen because of Arctic conditions or stuck tight because of an accident.

A further object of this invention is to permit one man to open the escape hatch in an enclosure without aid or assistance of any kind.

A further object is to allow quick opening of an escape hatch in spite of bulky clothing or other impedimenta handicapping the operator thereof.

Presently, there is a growing military and civilian need for equipment which can operate effectively in the extremely frigid environment of Alaska, Canada, Greenland, and similar areas. Present equipment with limited winterization for low temperature operation is inadequate for temperature extremes as low as minus 65 degrees F. This inadequacy is manifest in endurance and functioning of the equipment and in the operator's comfort and safety. Furthermore, cross country movement throughout the Arctic and sub-Arctic is exceedingly difficult because of the extreme cold; also because of irregular and difficult terrain, thawing conditions, dense forests and the large number of lakes, streams, swamps and muskeg. Moving vehicles are subject to falling through river ice or unexposed crevasses. Accordingly, a suitable means of escape through an escape hatch must be provided which will afford instant exit regardless of external weather or terrain conditions. Accessibility to, and easy maneuverability of, controls for operators handicapped by bulky clothing has to be given full consideration. The instant invention is designed to provide an escape hatch which will meet the objectives outlined above with a maximum of efficiency and a minimum of complication.

A form of construction according to this invention is illustrated in the accompanying drawings, in which—

Fig. 1 is an inverted perspective view of the escape hatch mechanism;

Fig. 2 is a detailed perspective view of the handle locking arrangement;

Fig. 3 is a detailed vertical section taken on line 3—3 of Fig. 2;

Fig. 4 is a transverse section taken on line 4—4 of Fig. 1 with the hatch in closed position;

Fig. 5 is a similar view to Fig. 4 showing the hatch in released position;

Fig. 6 is a section taken on line 6—6 of Fig. 5, parts being shown in elevation;

Fig. 7 is a detailed sectional view of one of the spring loading devices; and

Fig. 8 is a detailed sectional view of the spring detent for holding the handle in raised position.

Looking now with more particularity at Fig. 1, it is seen that the escape hatch mechanism comprises handle 1 which operates the racks 4 through gears 2, thereby moving the parallel rack extension bars 5. Handle 1 is supported by supports 11. Attached to the bars 5 are dogs 6 which fit within supports 7 or abut against wedges 8 depending on the relative position as will be described later in the operation of the escape hatch. These dogs 6 have parallel cam surfaces 6a and 6b. Bars 5 are supported by supports 10.

Handle 1 is held in raised position by detents 3. This arrangement is best shown in Figs. 2, 3, and 8. The detents 3 are friction-fitted into the ends of handle 1 and spring actuated by springs 23 working against detent piston 24. The tension of the springs 23 is adjusted by adjusting screw 29. The entire arrangements fit in casings 28 which are friction-fitted in the ends of handle 1. The detents 3 are pressed into place in bars 5 in depressions 13 situated below detent stops 12. Bars 5 have a further cut-out portion 14 to permit the detents 3 to clear the edges of bar 5 and allow the detents to snap into place.

Near the four corners of hatch cover 9 are spring loaded devices 30, one of which is shown in detail in Fig. 7. It comprises a spring 15 around a core 18 fitting within a casing 16. One end of the core terminates in a plunger 19 while the other end is held by piston 17 which fits into casing 22. Casing 22 is screw threaded to casing 16. Piston 17 moves through casings 16 and 22 and is limited in its journey by the end of casing 16 abutting against the end of piston 17. Casing 22 has pivotally fitted within it the eccentric end portion of handle 20 by pin 21. The entire device 30 is supported by support 27.

Looking now to the operation of the escape hatch, it is seen that the operator pulls handle 1 in a downward pivotal motion which moves bars 5 away from the pivotal point. This movement is effected through the interaction of gears 2 and racks 4. This causes dogs 6 to move out of locking supports 7 and against wedges 8. Cam surfaces 6a here operate to push against wedges 8 while the parallel cam surfaces 6b move easily out of locking supports 7. This forces hatch cover 9 away from hatch 25 and packing ring 26. The spring 15 of each of the spring loaded devices 30 is compressed by piston 17 by pushing handle 20 upward, prior to rotation of the handle 1. As the hatch cover is released by rotation of handle 1 and the movement of the dogs 6 from without locking supports 7, the springs 15 aid the movement of dogs 6 against wedges 8 to push the hatch 9 outward.

The hatch is easily and quickly secured once again by positioning cover 9 by the use of handle 31 over the hatch 25 and packing ring 26. Prior to this, handles 20 of the spring loaded devices 30 should be pulled downward to release the springs' tension. Handle 1 is then translated back to the upward position where it is held in place by detents 3 fitting into depressions 13 in bars 5. This movement causes the bars 5 to move dogs 6 back away from wedges 8 and into locking supports 7. Here again the fact that the cam surfaces 6a and 6b are parallel comes into play. Cam surfaces 6b are now the main operating force and pull the hatch cover down tightly at which point the point of cam surfaces 6b changes to one parallel to the bars 5. Interaction between cam surfaces 6a and the wedges at this stage of operation is avoided because of the parallel cam surfaces. The cover 9 is thus pulled into place against hatch 25 and packing 26 assuring a tight fit. Devices 30 are then again spring-loaded by pushing handles 20 upward.

This mechanism is so designed that by applying a 100 pound force to the handle 1, a 2500 pound force is exerted upon the hatch cover. This 2500 pound force alone is sufficient to break loose the hatch cover even when it is covered by approximately one inch of ice. The spring loaded devices 30 give an additional impetus to this 2500 pound force. The desired final lifting force of the mechanism can be varied in accordance with the selection of the size of the handle 1, gears 2, and rack 4.

While the invention has been described with particular reference to a hatch cover, it is to be understood that the principles and structure of the opening and locking mechanism as herein described may also be applied to other forms of closure means such as panels, doors, and windows.

Having thus described my invention, what I claim as new and wish to secure by Letters Patent is:

1. An escape hatch, comprising a hatch, a hatch cover, movable parallel bars supported directly underneath said cover, a plurality of dogs having camming surfaces attached to said bars, a plurality of wedges and locking supports in tandem corresponding in number to the said dogs and coacting with the camming surfaces thereon, said wedges and locking supports connected to the inner surface of said cover and juxtaposed over said bars, said supports having openings adapted for said dogs to fit therein and coact with the camming surfaces thereon, means for moving said bars in either direction in a plane parallel to said plurality of wedges and locking supports, whereby said dogs are moved in and out of said openings and selectively into engagement and disengagement with said wedges.

2. An escape hatch as claimed in claim 1, including a sealing gasket between the periphery of said hatch and said hatch cover and having a plurality of spring loaded devices pressing against the said hatch cover, said devices each comprising a casing, a spring, said spring encasing a core, said core terminating in a plunger pushing against the hatch cover at one end and connected at the other end to a movable cylinder within said casing, and an eccentric handle pivotally attached to said casing for actuating said cylinder.

References Cited in the file of this patent

UNITED STATES PATENTS

| | | |
|---|---|---|
| 2,108,224 | Haseltine | Feb. 15, 1938 |
| 2,631,032 | Denker et al. | Mar. 10, 1953 |